United States Patent [19]
Pfanzelt

[11] 3,864,604
[45] Feb. 4, 1975

[54] ELECTRICAL SWITCHING DEVICE

[76] Inventor: Josef Pfanzelt, Am Neugereuth 10, Freising, Germany

[22] Filed: May 8, 1973

[21] Appl. No.: 358,267

[30] Foreign Application Priority Data
May 8, 1972 Germany............................ 2222517
Aug. 17, 1972 Germany............................ 2240435

[52] U.S. Cl.............. 317/11 A, 317/11 C, 307/136, 307/133
[51] Int. Cl.......................... H02h 3/00, H02h 7/00
[58] Field of Search.... 317/11 A, 11 R, 11 B, 13 A, 317/139, 12 B, 157, 150; 307/133, 136, 134, 139, 141.4, 115, 116, 130, 131, 127, 132 R, 132 E, 135, 138

[56] References Cited
UNITED STATES PATENTS

| | | | |
|---|---|---|---|
| 3,239,723 | 3/1966 | Washington et al. | 307/130 |
| 3,249,810 | 5/1966 | Strom et al. | 317/11 A |
| 3,284,648 | 11/1966 | Koppelmann | 317/11 R |
| 3,614,464 | 10/1971 | Chumakov | 317/11 A |
| 3,671,816 | 6/1972 | Ritzow | 307/115 |

*Primary Examiner*—William H. Beha, Jr.
*Assistant Examiner*—Patrick R. Salce
*Attorney, Agent, or Firm*—Robert E. Burns; Emmanuel J. Lobato; Bruce L. Adams

[57] ABSTRACT

An electrical hybrid switching system for the spark-free switching of loads supplied from an AC line comprises a half-wave rectifier and two mechanical load switches, one in series with the rectifier and the other in parallel. The load switches are controlled by a circuit which is operable to open and close the switches sequentially during opposite half-waves of the alternating current so that each is opened or closed in "load-off" condition. To provide higher current-carrying capacity an auxiliary switch may be connected in parallel with the switching elements comprising the rectifier and the two load switches. In this event the auxiliary switch is also controlled by the control circuit so as to be closed only after the load switches are closed and to open before the load switches are opened. The switching system can be used for multiphase as well as single phase circuits and for resistive, inductive or capacitative loads independently of their phase angle difference.

20 Claims, 8 Drawing Figures

ELECTRICAL SWITCHING DEVICE

SUBJECT OF INVENTION

The present invention relates to a hybrid switching device for the spark-free switching of loads having arbitrary angular phase difference and supplied with alternating voltages, using at least one rectifier and first and second load switches. The rectifier can be shunted by the second load switch and is arranged in series with the first load switch in the load circuit supplying the load. The sequence of operation of the two load switches is so contrived that at "switch-on" first of all, and exclusively during a half-wave blocked by the rectifier, the first load switch is closed, and thereafter during a half-wave of the opposite polarity, the second switch is closed. At "switch-off" first of all, and exclusively during the half-wave in which the rectifier is conductive, the second load switch is opened and thereafter, during a half-wave blocked by the rectifier, the first load switch is opened.

BACKGROUND OF INVENTION

At switch-on and in particular at switch-off, especially of loads of inductive character such as electric motors, electromagnets or the like, so-called material migration effects occur, the cause of which lies in independent gas discharges, coupled with plasma formation, between the switching electrodes. This is a phenomenon which the relevant technical circles quite generally regard as one of the crucial problems of electrical engineering and in respect of which no effort has been spared in order to try to eliminate or at any rate ameliorate these highly damaging effects. One of the most serious consequences of these material migration effects, resides especially in a very considerable reduction in the service life of switching devices of this kind. Moreover, after a certain number of switching operations there is an increasing degree of unreliability in the switching function and, particularly in the context of the progressive automation of manufacturing processes, this is a drawback because in such an environment, with unmanned control of process sequences, a reliable mode of operation, especially on the part of switching devices such as relays and contactors which control electrical equipment, is an indispensable requirement. Despite these drawbacks, however, mechanical switching devices will for the present and, in the opinion of the relevant technical circles, in the future also, continue to be used for a very long time because they have a certain number of specific properties which cannot be achieved by other means thus far known. These include in particular a so-called zero to infinite ( $0:\infty$) switching ratio in closed-circuit and open-circuit conditions, as well as the potential isolation provided between input and output, also a low contact resistance coupled with practically negligible heating at the actual contact location, and not least the robustness and insensitivity of the contact system to shortperiod voltage or current overloads. However, in order to exploit these irreplaceable advantages and on the other hand to keep the described damaging effects of material migration, which is virtually unavoidable, at least within bearable limits, in known switching devices employing mechanical contact elements, either arc-extinguishing devices (so-called RC-elements) or what are referred to as extinguishing aids in the form of arc-extinguishing chambers, arc guide vanes, magnetic blowers or the like, have to be used. However, as far as successful design is concerned, these measures are relatively elaborate, take up valuable installation space, and ultimately cost money.

In the present state of the art, switching devices are of course known in which arcing, and therefore the damaging effects of material migration, are prevented. These are switching devices equipped exclusively with semiconductor electronic switching elements, which, however, have significant drawbacks that prevent their general use. The most important of these drawbacks, or at least the factor defining the limits of valuable application, consists, by way of comparison with switching devices using mechanical contact elements, of a substantially higher voltage drop and also of a likewise substantially higher power loss, of a detectable increase in the effective switching times when switching inductive loads due to the requisite damping of semiconductor switches in order to provide protection against exceeding their reverse voltage, of a substantially poor short-circuit tolerance, of an electrical connection between control and load circuits, which cannot be permitted in most cases, and, finally of the nuisance of radio interference, in particular when operating with phase gating.

For these reasons, hybrid switching devices have recently moved into the foreground. In such devices a hybrid arrangement of electronic circuit elements with conventional switching elements such as relay contacts or contactor systems is used with the objective of uniting the advantages of the two types of switching systems. The object of the present invention is a hybrid switching device of this kind and the starting point is the prior art as disclosed by the following literature sources: French Pat. No. 1,208,626, German published specification Nos. 1,092,984, 1,114,225, 1,267,304, 1,250,525 and 1,172,345, U.S. Pat. No. 3,558,910, ETZ-A volume 86 (1965, pp 496 to 500) and ELEKTRIE 24 (1970, pp 165 to 167).

Quite apart from the fact that some of the switching devices disclosed in the aforementioned literature sources, exhibit major differences with reference to the subject of the present application in terms of the number and connection of the mechanical switches and rectifiers, while others cannot generally be used both for opening and for closing a load circuit but only for disconnecting a load, or at any rate confine their disclosure to measures and means directed towards this end, none of the aforementioned literature sources provides any concrete indication as to the means and measures for securing correctly timed operation of the mechanical switches with reference to the polarity of the supply voltage and the phase of the switched current, this having been consistently set out in each case purely as an objective. It is precisely this, however, which, in view of the relatively short times available for the performance of the switching operation, is of prime importance and has not been satisfactorily resolved either technically or economically, by the means thus far disclosed.

SUMMARY OF INVENTION

The purpose of the present invention is to overcome the drawbacks of the prior art and to provide a hybrid switching device in which correctly timed operation of the load switches is ensured reliably, simply and also at economically viable costs.

In accordance with the invention, this is achieved in the manner that the switching circuit comprises a rectifier, a first load switch in series with the rectifier and a second load switch in parallel with the rectifier, and the control circuits for the operation of the load switches include decoupling elements which, considered with reference to the supply voltage, have mutually opposite polarities, and by means of which operation of the first load switch is produced exclusively during an alternating voltage half-wave blocked by the rectifier, and operation of the second load switch is produced exclusively during a half-wave of opposite polarity. Through this new technical principle, by comparison with known arrangements, concrete means and measures are for the first time disclosed which, using electrical components that have been proven in service over many years, is simple, compact and economical and with which correctly timed operation of the load switches, i.e., closing and opening of the switches during a supply voltage half-wave protected by the rectifier, is ensured in a reliable fashion without affecting the service life as a consequence of mechanical wear.

If, in accordance with a further development of the invention, the control circuits for operating the load switches contain voltage discriminators (for example zener diodes) with the help of which operation of the load switches independently of the timing of the switching pulses used to effect closing and opening of the load circuit, is ensured, then for the first time it becomes possible to operate completely independently of the nature and speed of operation of the start and stop keys of the switching device. By means of the voltage discriminators, in other words, in each case only a specific part of the supply voltage half-wave is gated out, i.e., a control voltage can be applied exclusively within a predetermined voltage range, this control voltage on the one hand being adequate to operate the means which influence the load switches and on the other hand being switched off again at a specific time before zero transit of the supply voltage. In this way the means used to operate the load switches can revert to their initial positions, if the start or stop pulse is delayed, and their excitation can be delayed until the occurrence of a later, suitable half-wave during the overall pass range of the voltage discriminators. Closing or opening of the load circuit during a "false" half-wave, i.e., during a half-wave not protected by the rectifier, is thus reliably excluded. Furthermore the voltage discriminators, without any additional outlay and in a fully automatic fashion, ensure that when switching inductive loads with consequent phase shift in the load current, which is the case virtually without exception in industrial operations, the load switches are operated exclusively during time intervals in which supply voltage and load current have the same sign.

The switching device in accordance with the invention is suitable not only for resistive loads and inductive loads having a complex resistance or impedance, but also for loads of capacitive nature, indeed with angular phase differences ranging between 0° and 90°. Thus, we are concerned here not with inductive loads to which, for compensation purposes, i.e., in order to improve their angular phase difference towards the ideal value of 0°, a capacitor has been connected, but with loads of "genuinely" capacitive nature, i.e., in practice, capacitors. Loads of this kind are used very little in general switching applications for machine control purposes, hoists or the like. However, for test rigs in laboratories or the like, it happens not infrequently that capacitive loads, sometimes of large capacitance, have to be switched. Here, of course, the particularly difficult problem arises that over certain intervals of time, during the half-waves of the alternating supply voltage and at switch-off, a backflow of electrical energy takes place from the capacitor, which has been charged to the peak level, into the zero-going current supply network. This problem, no viable solution to which is to be found in the prior art literature on the subject, requires very specific measures in order, despite the aforementioned difficulties, to ensure absolutely arc-free closing and opening of the load circuit. In accordance with a further development of the invention, however, this requirement can reliably be fulfilled in an extremely simple fashion and at small outlay, by providing an auxiliary switching device with the help of which the means used to operate the two load switches can be energized immediately after zero transit on the part of the supply voltage to the load. In this way, the critical opening of the second load switch is produced automatically and reliably during a part of the relevant supply voltage half-wave, in which the voltage and the leading current have the same sign so that the indicated backflow of energy from the capacitor cannot take place because the supply voltage is building up from zero towards the peak value.

As far as the influencing of the means used to operate the load switches is concerned, the invention leaves open an alternative to the extent that in accordance with further developments of the invention the means used to operate the load switches can be controlled either by a control quantity derived from the alternating voltage supplying the load, or by a control quantity derived from the load current.

Economy in special components and circuitry can be achieved if, in accordance with a further development of the invention, the response time of the means used to operate the load switches is arranged to be shorter than half the cycle time of the alternating voltage supplying the load. Assuming that excitation of such means starts at a corresponding time, this assures that they respond at the correct time and that thus, ultimately, the load switches are in each case operated in the "correct" supply voltage half-wave, i.e., the one protected by the rectifier. An example of the invention which has proved itself in practice, is one in which the means used to operate the load switches require for excitation a time of, for example, less than or equal to about a third of half the cycle time of the alternating supply voltage, because then, without the need for additional components and purely because of the switching characteristics of the voltage discriminators already referred to, the operating means can be energized during the time of conduction of the voltage discriminators, while in the eventuality that the start or stop pulse should have commenced late, they can be reset to their initial positions during the time interval elapsing between the non-conductive state of the voltage discriminators and the zero transit in the supply voltage, and consequently cannot possibly be operated during a false half-wave.

The time required for the excitation of the means used to operate the load switches can be shortened, while at the same time advantageously increasing the safety margin for correctly timed operation of the switches, by arranging that in accordance with a further development of the invention these means are electrically pre-energized. This pre-energizing or pre-excitation in other words ensures that, considering for example electromagnetic means, the build-up of the magnetic excitation field is completed already up to the non-operating current limit of the means, and if the energizing circuit is designed for example for magnetic saturation, the final operation of the means requires only a relatively short control time.

An effect which in function is similar to the measure last described, is achieved if, in accordance with a further embodiment of the invention, the control quantity for energizing the means used to operate the load switches, has an amplitude several times higher than the nominal excitation level of said switches, and if circuit elements (for example capacitors, wiper contacts on the start and stop keys, negative temperature coefficient resistors, or the like) are provided so that the boosted control quantity is applied exclusively within limited time intervals.

A preferred example of the subject of the invention is one in which, in order to operate the load switches, bistable relays are used. Relays of this kind have several noteworthy advantages in the context of the invention. For example, virtually completely independently of the mode of operation of the start and stop keys, determinate switching states can be produced within the circuits used to control the means which operate the load switches. In addition, to start and stop the switching device, single, relatively short current pulses will suffice and, consequently, throughout the time of closure of the switching device, no electrical power need be supplied to the control circuits. Furthermore, relays of this kind, because they are premagnetized by a permanent magnet, are extraordinarily fast-operating so that they can switch readily within the time of half a cycle of the supply voltage and even have an adequate time safety margin for any resetting to the initial position which may be made necessary as a consequence of delayed start or stop. Finally, a significant advantage of bistable relays of this kind is that in comparison to monostable relays they have approximately the same pull-in and drop-out times and this is a favorable factor as far as the design of the control circuits in the context of closing and opening of the load circuit is concerned.

If the subject of the invention operates in conjunction with an auxiliary switch (overload switch or the like) used to relieve the load on the rectifier and the two load switches, then in accordance with a further development of the invention, the control circuit for operating the two load switches includes means for operating the auxiliary switch (for example the energizing winding of a high-current contactor) by means of which the rectifier and the two load switches are shunted, after the closing of the second load switch until a time prior to the opening of the first, by one or more electrically parallel working contacts of the auxiliary switch. It is possible in this way, at small outlay and while achieving a maximum service life of the switching device, to carry out completely off-load switching even of relatively heavy currents and high voltages. The contacts of the auxiliary switch are in other words protected by the switching section (constituted by the rectifier and the two load switches) of the primary switching device, i.e., they are simply connected in parallel with this switching section, which has already closed the load circuit in off-load fashion, and open-circuited before the actual switching section opens itself. The contacts of the auxiliary switch are thus only made to carry current when the circuit is already closed and the current limit is determined purely by the thermal capacity of their cross-sectional areas. The current which, in accordance with the invention, flows in parallel to the switching section of the actual switching device, across the contacts of the auxiliary switch, can thus be very much higher than that which these contacts could be expected to take in conventional operation, assuming arcing. Consequently, this kind of auxiliary switch which is fundamentally designed for low switching power, can be operated, despite the high load current, without any arc extinguishing aids or the like because the problem of arcing is eliminated right from the start because of the principle of operation of the subject of the invention. In this context, it should be noted in particular, considering the aforementioned parallel connection of several contacts of the auxiliary switch, that this for the first time provides a genuinely effective parallel arrangement with a corresponding multiplication of the load current carried by the contacts, because the closing and opening of the load circuit is effected through the load switches of the switching device in accordance with the invention so that any differences in the timing of the operation of the individual, electrically parallel contacts of the auxiliary switch produce no deleterious effect. Moreover, this kind of parallel connection of several contacts, with corresponding multiplication of the current switched by an individual contact, can advantageously also be employed in respect of the load switches themselves because the switched power of the switching device in accordance with the invention can be increased correspondingly without employing an auxiliary switch at all.

Moreover, it is self-evidently within the scope of the invention to use not merely a single auxiliary switch but also a second or, in extreme cases, even more auxiliary switches, in association with the main switching device itself, in such a way that the auxiliary switches are parallel-connected successively in cascade fashion so that load circuit can be switched entirely without arcing even when carrying the heaviest currents. Here, again, a significant factor is that the auxiliary switches require no extinguishing aids and that their switching contacts can be made considerably smaller, considering the load current which they are carrying, than would be possible under normal operating conditions, i.e., with operation under load. Apart from the fact that because of the reasons hereinbefore mentioned the auxiliary switches can be designed in a compact and cheap manner, there is the additional advantage of a considerably longer service life because the contacts are not affected by material migration phenomenon and are instead purely thermally loaded when in the already closed condition.

In accordance with a further development of the invention, at least one of the leads of the control circuits used to operate the load switches, can obtain a break-contact of the auxiliary switch by means of which, upon disconnection of the load, electrical control of the control circuits operating the load switches can be delayed until the galvanic shunt across the rectifier and the two load switches has been broken. This measure has the advantage that a positive circuit sequence is produced which, with a high degree of reliability, ensures correctly timed closing and opening of the contacts of the auxiliary switch.

The advantages of the two last mentioned further developments of the invention, can advantageously be combined if, in accordance with a further embodiment of the invention, the break contact included in at least one lead of the control circuit responsible for operating the load switches, is arranged to form, together with a make-contact used to electrically shunt the load switches and the rectifier, a make-and-break contact. This measure not only secures the advantages aforementioned, but also falls into line with the normal kind of contact arrangement provided in commercially available contactors, so that a special design is avoided.

If the switching device in accordance with the invention is provided with an auxiliary switch, then the latter must become operative exclusively under certain conditions of operation of the switching device. In accordance with a further development of the invention, this is ensured in that circuit elements are provided for electrically shunting the rectifier and the load switches only after the closing of the second load switch. Moreover, the means for operating the load switches only become effective after the opening of the electrical shunt.

In accordance with a further development of the invention, comprising a switching device for supplying a multiphase (e.g., $n$-phase) load with a plurality (e.g., $n - 1$) of control circuits for operating the load switches, such switching device cooperating with an auxiliary switch, the control circuits for operating the load switches are arranged to drive in a disjunctive fashion an auxiliary switch which is commonly assigned to all the control circuits, operation of the contacts of the auxiliary switch being delayed by a delay element (for example by means of a circuit element having a negative temperature coefficient, or the like), until all of the load switches of the different phases of the voltage supplying the load have closed. In this fashion, only one auxiliary switch is required although nevertheless correctly timed and completely load-free closing and opening of the auxiliary switch (designed for example as switching elements of a conventional heavy-current contactor) is ensured. In the switching of multiphase loads, in other words, at the commencement of the control pulse reponsible for the switch-on and switch-off of the switching device, it cannot directly be predicted which individual phases will be the last to be switched. Because, however, electrical shunting of the rectifier and the two load switches can be carried out by the make contacts of the auxiliary switch only if all the load switches of all the individual phases have closed, corresponding precautions must be taken. These precautions, in accordance with the further development of the invention, consist in providing a delay element for the auxiliary switch, this involving only a small additional outlay and ensuring a reliable mode of operation.

It is an advantage, as far as the lastmentioned embodiment of the invention is concerned, if, in accordance with a further embodiment of the invention, the delay element is electrically shunted during the time of operation of the auxiliary switch by a make-contact of said same switch. In this fashion, quite apart from protecting the delay element by short-circuiting the current flowing through it, it is in particular ensured that the delay element, which has the property that in the uncharged state it draws a heavy current and that this current tends to zero after charging, is regenerated immediately after it has been short-circuited so that it is thus reavailable in the shortest possible time for renewed start-up of the switching device, i.e., a rapid switching sequence on the part of the switching device is ensured.

BRIEF DESCRIPTION OF DRAWINGS

In the following description, the invention will be explained in more detail with reference to the accompanying drawings illustrating preferred embodiments of the invention.

DESCRIPTION OF PREFERRED EMBODIMENTS

Figure 1:
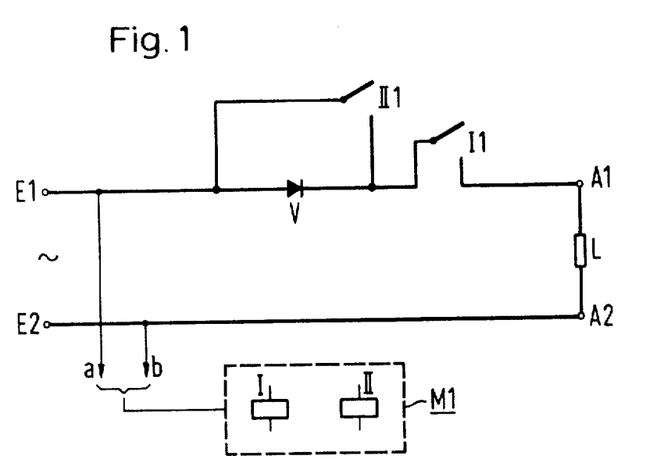
FIG. 1 illustrates schematically the basic design of a switching device in accordance with the invention for switching a single-phase load.

FIG. 1 shows a switching circuit for connecting terminals A1 and A2 of a load L to alternating current input terminals E1 and E2. The circuit is shown as comprising a rectifier V in one of the connecting lines, a first load switch II connected in series between the rectifier and the load and a second load switch III connected in parallel with the rectifier. The load switches II and III are controlled by a control circuit shown in FIG. 2 as comprising a start key A$n$, a stop key with ganged contacts A$b$1 and A$b$2, a relay controlling the load switch II having a pull-in winding IA$n$ and drop-out winding IA$b$, and a relay controlling the load switch III having a pull-in winding IIA$n$ and a drop-out winding IIA$b$. Switch contacts I2 and II2 are operable respectively with load switches II and III. The circuit further comprises a current limiting resistor BW, diodes D1 and D2 and zener diodes Z1 and Z2 connected in the manner shown in FIG. 2 and operating as described below to control the actuation of the load switches. Power supply leads $a$ and $b$ are connected respectively to the input terminals E1 and E2 as shown in FIG. 1.

Figure 2:
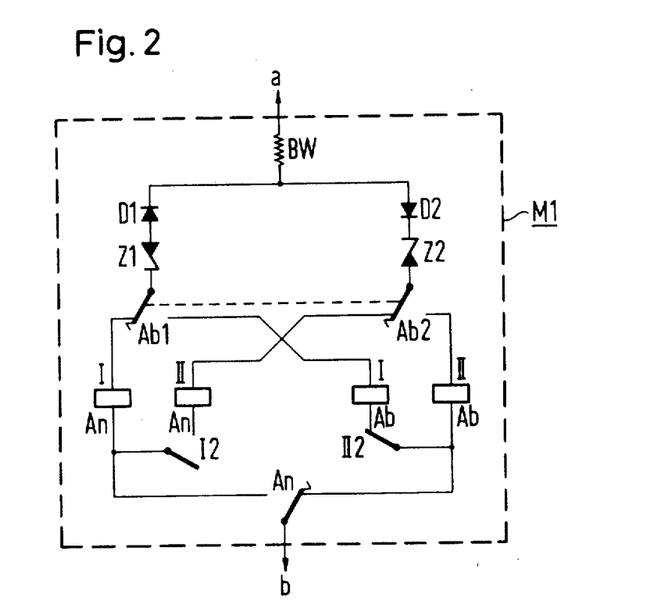
FIG. 2 illustrates in more detail the means for operating the load switches of the circuit shown in FIG. 1.

The mode of operation of the switching device schematically illustrated in FIGS. 1 and 2, is as follows. If an alternating voltage is applied across the input terminals E1 and E2, for example single phase alternating voltage of 220 volts, and if the load marked L is connected across the output terminals A1 and A2 to the switching device, then with the load switches II and III in the positions shown in FIG. 1, no current can flow because both switches are open. Only when a start key An is operated, can the process of switch-on of the switching device, be initiated. Upon operation of this start key An, a circuit can be made (only during a specific half-wave of the supply voltage to the load L) from the input terminal E2 by a wire b, the start key An, the relay IAn, a closed stop key contact Ab1, a zener diode Z1, a diode D1, a current limiting resistor BW and a wire a, to the input terminal E1. Of course, as already mentioned, this only happens if the diode D1 is conductive, i.e., if a half-wave of positive sign appears at the input terminal E2. Also, the circuit described is only closed during a quite specific part of the half-wave, which is determined by the opening and closing of the voltage discriminator in the form of the zener diode Z1. The object of this is that if the starting pulse is late, i.e., if there is the risk that although the pull-in winding of the relay I is energized in the "right" half-wave, the mechanical closure of the load switch I1 controlled by this relay only takes place in the ensuing half-wave because of the requisite changeover time, a kind of safety margin is provided during which the relay IAn energized by the aforesaid pulse, can reliably drop back to its initial position. If, for example, the supply voltage has a frequency of 50 c/s with a time of 10 ms per half-wave and when using a bistable relay with a switching time of about 3 ms, a zener diode Z1 is used which opens for about 3 ms during the peak of the half-wave. It is thereby reliably ensured that the relay IAn will revert to its initial position even if the start pulse produces vigorous but incomplete excitation of the relay winding, after the maximum value of the supply voltage has been exceeded up to the time of blocking of the zener diode Z1. This ensures that the load switch I1 is only closed if the valve rectifier V contained in the load circuit is in the blocking condition. If, as can quite readily happen in practice, delay of the start pulse occurs, then the resetting of the pull-in relay IAn to its inoperative position prevents the switching operation by the switching device from being initiated, because the contact I2 is still open, and starting does not take place until the next half-wave but one, of the same polarity, during which the excitation of the relay IAn commences as soon as the zener diode Z1 starts its breakdown, so that the relay switches reliably and in a correctly timed fashion. With the pull-in of the relay IAn, the load switch I1, operated by it, is also closed. This takes place completely off-load, because when it happens, because of the positive sign of the supply voltage appearing at E2, the rectifier V is in the blocking condition so that no current can flow. After the closure of the load switch I1, the load circuit is now ready for the next half-wave, of opposite polarity. During this half-wave, which thus appears with positive sign at E1, the rectifier V conducts and, because the load circuit is already fully closed across the already closed load switch I1, the load switch II1 can also close fully off-load. This closure of the load switch II1, is produced by the likewise bistable relay IIAn, in fact by the energizing of its pull-in winding through the path comprising the input E1, the wire a, the current limiting resistor BW, the diode D2, the zener diode Z2, the stop key contact Ab2 which is not operated, the pull-in winding of the relay IIAn, a contact I2 which is preparatorily closed, the still operated start key An, the wire b, and the input E2. Thus, the overall load circuit is closed in fully off-load fashion. The rectifier V, in relation to the power switched, can be dimensioned extraordinarily small because it is loaded only during the time of half a cycle of the supply voltage and is then shunted by the load switch III. On the other hand, the load switches II and III can carry a very heavy current which is limited only by the thermal loading capacity of their cross-sectional areas. In this context, furthermore, several load switches can be connected in electrical parallel and, with the switching device in accordance with the invention, this provides a multiplication of the current carrying capacity which corresponds to the number of individual contacts. In contrast to this, in switches of known design and operation, there is a widely held but incorrect belief that parallel connection of contacts yields multiplication of the current carrying capacity. However, this is far from being the case because when carrying out switching under load, it is always that contact which is the first to close or the last to open, which carries the full current peak, and absolutely simultaneous closing and opening of the individual contacts is something which simply cannot be mechanically guaranteed and is not attainable in practice.

If the load circuit shown in FIG. 1 is to be opened, then first of all and under the protection of the rectifier V which is conducting, the load switch III is opened during the "appropriate" half-wave of the supply voltage and subsequently, during a half-wave of opposite polarity, under the protection of the non-conductive rectifier V, the load switch II is opened. This is brought about by operation of a stop key with several contact sets Ab1, to Ab2. Because the contact II2 is still open, temporarily only the drop-out winding of the relay IIAb can be energized, and this indeed only during a half-wave in which the diode D2 is conductive. The current path here, is as follows: +, E1, a, BW, D2, Z2, Ab2, IIAb, An, b, E2 –.

Simultaneously with the opening of the load switch III, the contact II2 is also opened and readies the relay IAb for operation. In the half-wave of opposite polarity, which now follows, the relay IAb is also returned to its initial state by current through the following circuit: +, E2, b, An, II2, IAb, Ab1, Z1, D1, BW, a, E1, –.

With this resetting of the relay IAb, the load switch I1 controlled by it also opens in fully off-load fashion because the rectifier V is in blocking condition. Also, the contact I2 will have been returned to the position shown in FIG. 2, so that the switching device as a whole is now back in the starting position. Self-evidently, as far as any delay in appearance of a control pulse during the aforementioned stop-phase of the function of the switching device, the relay IIAb follows the behavior already referred to in respect of the start function, i.e., an initial resetting of the relay IIAb is only possible if the control pulse occurs in good time before the blocking of the zener diode Z1, failing which, through the agency of the diode D1, the function is automatically postponed until the next half-wave but one of the same polarity.

Figure 3:
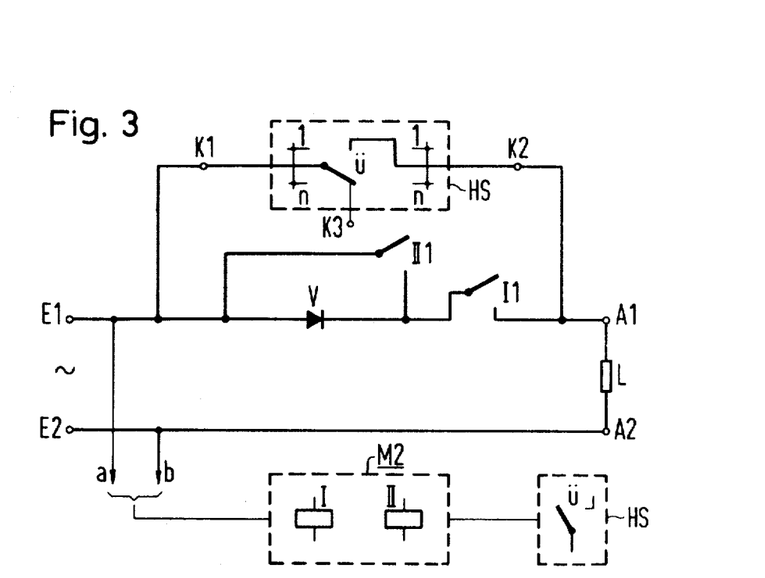
FIGS. 3 and 4 illustrate a switching device substantially corresponding to that of FIGS. 1 and 2 but having an auxiliary switch for shunting the switches in the load circuit.
Figure 4:
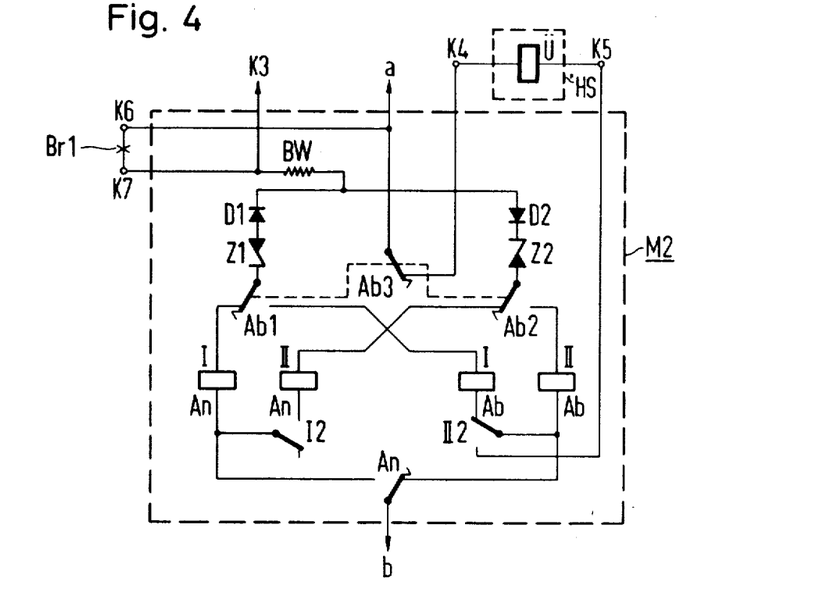

The switching device illustrated in FIGS. 3 and 4 corresponds in its structure essentially to the basic embodiment shown in FIGS. 1 and 2, the difference being the addition of an auxiliary switch HS in order to increase the switched power. To the extent that identical components are used, they are identified by the same reference as in FIGS. 1 and 2. These components are as follows: the input terminals E1, E2, the output terminals A1 and A2, the rectifier V, the load switches I1 and III, the load L and the wires a and b in the load circuit as well as the start key A*n*, the two bistable relays with respective pull-in and drop-out windings IA*n*, IIA*n*, IA*b*, IIA*b*, the stop key with mechanically connected contact sets A*b*1, A*b*2, two diodes D1, D2, two zener diodes Z1, Z2 and the current limiting resistor BW in the device M2 for controlling the load switches.

The new components, in the load circuit, include switching contacts of the auxiliary switch HS consisting of several electrically parallel-connected make-and-break contacts *u*, the make contacts being connected across terminals K1 and K2 to the load circuit and one of the break contacts being connected across the terminal K3 to the control device M2. In the control device M2, the stop key is supplemented by a third contact set A*b*3, the break contact of which is connected to a terminal K4 of the auxiliary switch HS. The break contact of the relay contact set I12 is also used and is connected to a terminal K5 of the auxiliary switch HS. Between these two terminals K4 and K5 of the auxiliary switch HS the energizing winding of a contactor U is connected. Furthermore, the limiter resistor BW is no longer connected directly by the wire *a* to the input terminal E1 of the load circuit, but instead is connected to the terminal K3 of the auxiliary switch HS. Finally, terminals K6 and K7 and a bridge B*r*1 are provided, by means of which, with alternative operation of the switching device without an auxiliary switch HS, a direct connection to E1 can be established through the wire *a*. In operation with the auxiliary switch HS, this bridge B*r*1 is thus removed.

The mode of operation of the switching device illustrated in FIGS. 3 and 4 is identical, in terms of the off-load closing and opening of the load circuit by the load switches I1 and I12 and the rectifier V in association with the control device M2, to that described in relation to FIGS. 1 and 2 so that no repetition of the explanation is required here. The following explanation will accordingly be confined to a supplementary description of the operation of the auxiliary switch HS. As already mentioned, shunting of the switching elements V, I11, I1 of the load circuit shown in FIG. 3, by means of the bridging contact *u* of the auxiliary switch HS, must take place only when, on closing of the load circuit, the load switch I11 has already closed, while on opening of the load circuit, this shunt or bridge must be opened before the load switch I1 is opened. This is ensured by virtue of the fact that when the switching device starts, the energizing winding, connected by the terminals K4 and K5, of the contactor U can only be energized if the contact I12 has changed state, i.e., if the bistable relay IIA*n* and the load switch I11 which it controls, are actually actuated. In this context, depending upon the polarity of the half-wave of the alternating supply voltage, the following circuit will be produced by the control device M2:

+, E1, *a*, A*b*3, K4, U, K5, I12, A*n*, *b*, E2, − or,

+, E2, *b*, A*n*, I12, K5, U, K4, A*b*3, *a*, E1, −.

The contactor U is thus energized each half-wave and closes its make-contact or a plurality of its electrically parallel make-contacts. In this fashion the auxiliary switch by means of its terminals K1 and K2, is shunted across the switching elements of the load circuit constituted by the rectifier V and the two already closed load switches I11, I1, in a fully off-load fashion so that with corresponding dimensioning of the cross-sectional area of the contacts *u* these carry current only in the closed state and their current carrying capacity is therefore very high.

With opening of the load circuit, the bistable relays IA*b* and IIA*b* can only be energized if, following operation of the stop key, the contacts *u* of the auxiliary switch HS, are in their open position, i.e. if shunting of the switching elements V, I11, I1 has been cancelled and the break contact of *u* is again occupying the position shown in FIG. 3. It is only then that by the terminal K3 a voltage can be applied to the control device M2. The dropping of U itself is initiated by depressing the stop key, the contact set A*b*3 of which interrupts the current to the contacts U. After *u* has dropped, in further sequence, by K3 and in a manner already described in relation to FIGS. 1 and 2, first of all the relay IIA*b* and thereafter the relay IA*b*, are returned to their starting positions.

Figure 5:
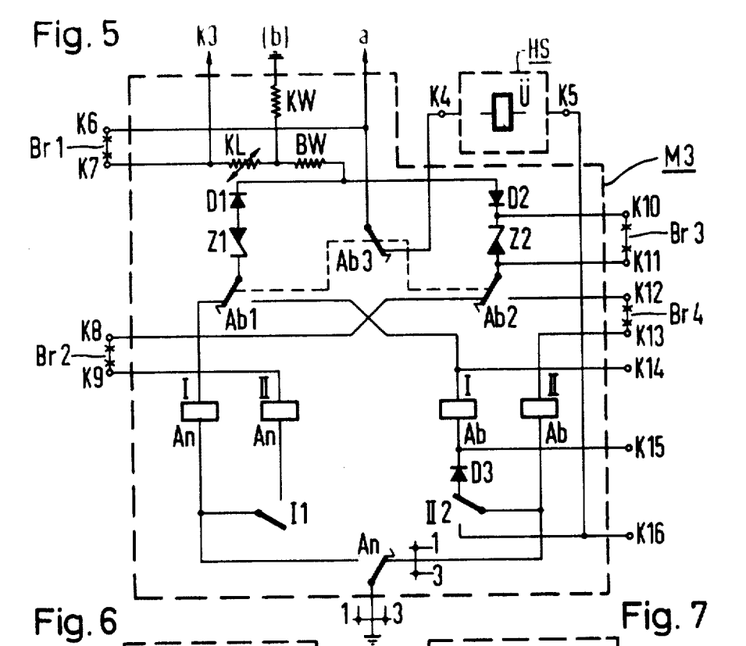
FIG. 5 illustrates a device with means for operating the load switches in a universal design for switching a single-phase or multiphase load and suitable for connection of an auxiliary switch as well as an auxiliary switching device for switching a capacitive load.

The control device M3 illustrated in FIG. 5, with means for operating load switches, again very largely contains components of a kind already used in the control devices M1 and M2 of FIGS. 2 and 4, so that in respect of these components the references already used will be retained. The device M3, however, is of universal design and can be employed alternately either to switch a single-phase load without an auxiliary switch, as in FIG. 1 or with an auxiliary switch HS, the auxiliary switch again, as required, being designed either in accordance with FIGS. 3 and 4 or in accordance with FIGS. 5 and 6. The control device M3 is also suitable for switching a multiphase load or without an auxiliary switch HS and, finally, it also makes it possible to carry out off-load switching of a capacitive load, using an auxiliary switching device HC of the kind shown in FIG. 7. To provide these alternative modes of operation, the control device has various terminals through which on the one hand bridges B*r*1 and B*r*4 can be included in circuit or removed therefrom as required, and on the other hand the aforesaid additional devices HS and HC can either be connected in indivitually or jointly. These terminals are marked K1 to K16, the terminals K1 to K7 being reserved for the connection of the auxiliary switch HS and the terminals K8, K16 for the connection of the auxiliary switching device HC. Furthermore, the control device M3 is equipped with a current limiter, in the form of a negative temperature coefficient resistor KL, to protect its components against thermal overload during start and stop operations of the switching device, this limiter being externally heated through the agency of a resistor KW. Instead of a current limiter of this kind other measures can be introduced, in order to prevent thermal overload. For example, the start and stop keys can be equipped with contact sets which in each case are designed as so-called wiper contacts. Finally, it should be pointed out that the break contact and the center contact of the start key A*n*, which contact is grounded, or is connected to the wire *b*, are each multipled and this has been indicated by a multiple symbol 1 to 3. This means that only one start key A*n* need be provided even where a multiphase load is being switched and, through the aforementioned multiples, the corresponding lines of the control devices M3 belonging to all the individual phases, can be jointly connected into circuit. Whereas the start key must have a number of make-contacts corresponding to the number of individual phases, these make-contacts in each case are electrically insulated from one another and are individually connected to the respective relays IAn of the controldevices belonging to the individual phases. Furthermore, the control device M3 illustrated in FIG. 5 is distinguished from the devices M1 and M2 thusfar discussed, by the presence of an additional diode D3 which, together with a diode D4 of the auxiliary switching device HC, serves a purpose which is yet to be discussed. The mode of operation of the device under the alternative operating conditions described hereinbefore, will be explained in more detail hereinafter, making reference to the FIGS. 6 and 7, in conjuncation with the additional devices HS and HC.

Figure 6:
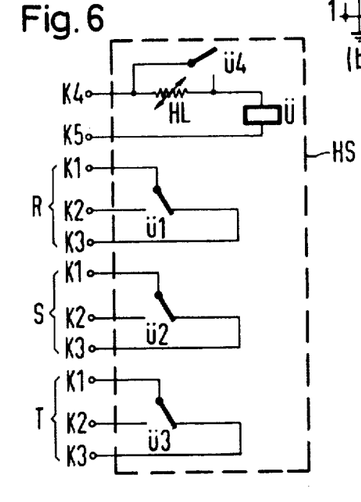
FIG. 6 illustrates in more detail the auxiliary switch schematically indicated in FIG. 5.

The example of an auxiliary switch HS, illustrated in FIG. 6, will in practice conveniently be designed as a heavy current contactor possessing three high-rated make and break contacts $u1, u2, u3$ as well as an auxiliary contact $u4$ and an energizing winding U. With operation of the auxiliary switch HS in association with a switching device for off-load switching of a single-phase load, the said three make and break contacts can be electrically parallel at least at the make sides, so that the current carrying capacity is effectively tripled. In the illustrated example, which applies to the switching of a three-phase load fed from a three-phase network, the three make and break contacts of the auxiliary switch HS are taken in grouped fashion for the three phases R, S and T, to terminals K1, K2 and K3. The energizing winding U is in series with a positive temperature coefficient resistor HL which ensures that the contactor only responds when the load switches of all the individual phases of the three load circuits, have actually closed. In this fashion, therefore, for a three-phase load and while maintaining the requisite electrical separation between the individual phases when shunting the switching elements in the load circuits, a single auxiliary switch HS can be used quite irrespective of the completely unpredictable sequence of response of the individual load switches at the time of start of the switching device. The said positive temperature coefficient resistor HL, as can be seen, can be shunted by the auxiliary contact $u4$ which closes simultaneously with the other contacts $u1$ to $u3$. By this shunting or bridging operation, the positive temperature coefficient resistor HL is for one thing relieved of any load because of the short-circuiting of the current, and for another, in particular, is cooled immediately after the auxiliary switch HS has responded so that after the switching device has undergone the stop-phase, is immediately ready for a renewed start.

Figure 7:
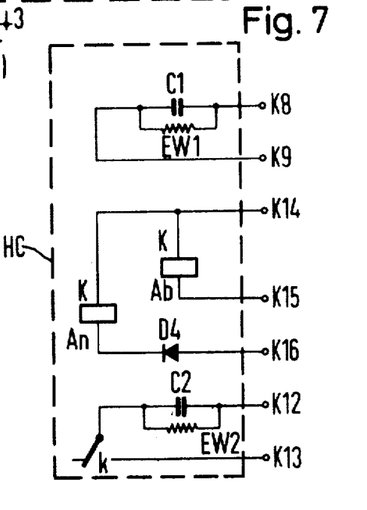
FIG. 7 illustrates in more detail the auxiliary switching device schematically illustrated in FIG. 5 for switching a capacitive load.

The auxiliary switching device HC illustrated in FIG. 7 contains a line connected across the terminals K8 and K9 containing a capacitor C1 which is shunted by a discharge resistor EW1. Also a bistable relay with a pull-in winding KAn in series with a diode D4, and a drop-out winding KAb are connected as shown with the terminals K14 and K16. Finally, there is a further line between the terminals K12 and K13 in which a second capacitor C2 with a shunt discharge resistor EW2, and a make-contact $k$ of the relay K, are included.

The alternative modes of operation will now be described in more detail and subdivided into groups to provide a clearer understanding.

Switching a Single-Phase Load Without an Auxiliary Switch HS and Without an Auxiliary Switching Device HC The bridges Br1, Br2 and Br4 are connected between the terminals K6/K7, K8/K9 and K12/K13, while the bridge Br3 between terminals K10/K11 is removed. The connection of the control device M3 to the load circuit (not shown), for example with a load circuit of the kind shown in FIG. 1, is effected through the wire $a$ and the wire $b$, the latter having been shown as grounded to correspond with another operating situation. All of the other terminals are open. Thus, the control device M3 (appart from the current limiter which is not absolutely essential and which consists of the negative terminal coefficient resistor KL and the resistor KW) is completely identical in design with the control device M1 of FIG. 2 and thus its mode of operation is the same as that already described in relation to FIG. 2.

Switching a Single-Phase Load With an Auxiliary Switch HS

The bridges Br2 and Br4 are in position while the bridges Br1 and Br3 are removed. The connection between the control device M3 and a load circuit, for example in the manner shown in FIG. 3, is effected through the wires $a$ and $b$. The auxiliary switch HS, contacts $u1$ to $u3$ of which are conveniently electrically parallel at least on the make contact sides, by the terminals K1 and K2 of the individual phase groups R, S, T, is connected by the terminals K1 to K5. The terminals K1 and K2, in the manner visible from FIGS. 3 and 4 are already discussed above, are assigned to the load circuit for shunt purpose, while by the terminal K3, likewise in a manner already described, energizing of the relays IAb and IIAb prior to the drop-out of the auxiliary switch HS, is prevented. The energizing of the winding U of the auxiliary switch HS is effected by the terminals K4 and K5, the contact II2 of the control device M3 preventing any response until the load switches I1 and II1 are closed. The response of U is also delayed by the positive temperature coefficient resistor HL although this is irrelevant to the present case, only being of any significance where the switching of a multiphase load is involved. The other functions inside the control device are again the same as already described.

Switching a Single-Phase Load of Capacitive Nature, Using an Auxiliary Switching Device HC If an auxiliary switch HS is used at the same time, the bridge Br1 is removed and the auxiliary switch connected in the manner discussed below by the terminals K1 and K5. In operation without an auxiliary switch HS, the bridge Br1 is placed in position. To connect the control device M3 to a load circuit $s$, for example in accordance with FIG. 1, once again the two wires $a$ and $b$ are employed. Furthermore, the bridge Br3 is placed between the terminals K10/K11 so that the zener diode Z2 is shortcircuited. The bridges Br2 and Br4, on the other hand, are removed. The connection of the auxiliary switching device HC is effected by the terminals K8, K9 and K12 to K16.

If the control device M3 is used to switch a load circuit of the kind shown in FIG. 1 for example, and no auxiliary switch Hs is used, then upon operation of the start key An, in the manner already described, first of all the relay IAn pulls in, this preparatorily closing its contacts I2 for the relay IIAn and at the same time closing the load switch I1. This closure of I1 takes place fully off-load, despite the uncharged state of the capacitive load L, which would fundamentally imply a very heavy initial current, because the rectifier V is in the blocked state. During the next half wave of opposite polarity, likewise in a manner already described, the load switch II1 is closed off-load and, simply by means of the capacitor C1 with its discharge resistor EW1, connected across the terminals K8 and K9, the continuous current supplied to the relay IIA$n$ is reduced to zero, after an adequate high initial current has been drawn, in order to compensate for the increased control voltage produced by short-circuiting the zener diode Z2 across the bridge Br$_3$.

With the opening of the load circuit containing the capacitive load L, after a certain angular range has been exceeded within the halfwave, the supply voltage and the load current in the load circuit will have opposite signs so that there is the risk that when the load switch II1 is open, the current produced by the capacitor L charged up to the peak supply voltage, will "flow back" into the load circuit. This must be prevented, however, because otherwise the load switch II1 will be open, not under the protection of the conductive rectifier V, but under the load of the back-flowing capacitor current from the load L. This is achieved by virtue of the fact that the resetting of the relay IIA$b$ and therefore the opening of the load switch II1, are displaced in all cases from the unpredictable point of commencement of the stop pulse which occurs randomly within the halfwave, to a specific point in time at which the supply voltage and the load current in the load circuit can be reliable ensured to have the same sign, so that the loadswitch II1 can open without any risk, under the protection of the conductive rectifier V. To this end, the bistable relay KA$n$ KA$b$ is provided, the contact K of which switches in the control voltage for the relay IIA$b$ only after KA$n$ has pulled in. However, KA$n$ can only pull in during a supply voltage half-wave in which the diode D1 is conductive and the rectifier V is blocked, consequently the relay IIA$b$ is in all cases energized at the same time directly after the commencement of the "correct" half-wave for which the rectifier V is conductive, so that the load switch II1 which it controls is also opened at the correct time.

The circuit which is made when the switching device is stopped by operation of the key A$b$1, A$b$2, A$b$3, is as follows:

+, E2, $b$, A$n$, II2, K16, D4, KA$n$, K14, A$b$1, Z1, D1, BW, KL, K7, Br1, K6, $a$, E1, −.

After KA$n$ has pulled in in the next half-wave of opposite polarity, the current flows by the circuit:

+, E1, $a$, K6, Br1, K7, KL, BW, D2, K10, Br3, K11, A$b$2, K12, C2, parallel EW2, $k$, K13, IIA$b$, A$n$, $b$, E2, −.

In this way, IIA$b$ is reset to the start position so that the loadswitch II1 opens and the contact II2 returns to its open position. This resetting of IIA$b$, because of the capacitor C2 and the high initial current, takes place immediately after zero transit on the part of the voltage supplying the load L.

The further path of the circuit is as follows: +, E2, $b$, A$n$, II2, D3, IA$b$ parallel K15-KA$b$-K14, A$b$1, Z1, D1, BW, KL, K7, Br1, K6, $a$, B1, −. Through this circuit, the relays IA$b$ and KA$b$ are returned to their initial position so that the loadswitch I1 opens and the contact I2 returns to the open position. The switching device as a whole is thus restored to the starting position.

The aforementioned mode of operation also applies to operation of a switching device in association with an auxiliary switch HS. Here, the diodes D3 and D4 serve a blocking function and prevent immediate response on the part of the energizing winding U of the auxiliary switch HS, due to currents applied across the terminals K14 to K16 of the auxiliary switching device HC.

Switching a Multiphase Load Without an Auxiliary Switch HS and Without an Auxiliary Switching Device HC Here, the circuit and mode of operation are the same as those already described in respect of the switching of a single-phase load under the same conditions. The sole difference is that a number of control devices M3 corresponding to the number of individual phases, are used, and are connected by the wires $a$ to respective ones of the individual phases, while on the other hand the wires $b$ are in each case grounded.

Switching a Multiphase load with an Auxiliary Switch HS

Here, again, the circuit and mode of operation are the same as those already described with reference to FIGS. 5 and 6. The connection of the control devices to the load circuits is again effected by the wires $a$, while the wires $b$ are each grounded. It should be expressly pointed out that only one auxiliary switch HS need be provided, irrespective of the number of individual phases.

Switching a Multiphase Load with an Auxiliary Switching Device HC

The circuit and mode of operation, in this case also, have already been covered with reference FIGS. 5 and 7. The auxiliary switching device HC is, of course, required for each individual phase, in the same way as in the control device M3.

Figure 8:
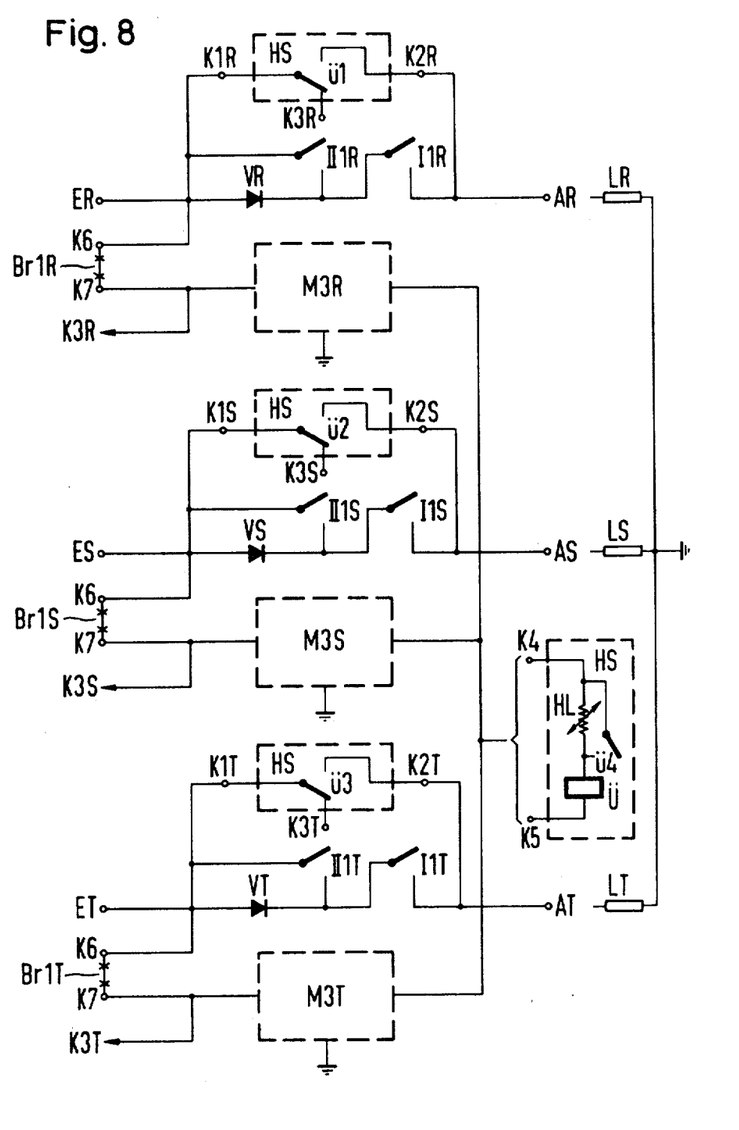
FIG. 8 illustrates the load circuit for a multiphase load, with schematically indicated devices comprising means for operating the load switches.

Switching a Multiphase Load Using Auxiliary HS and Auxiliary Switching Device HC This mode of operation, again, is essentially the same as already descussed in relation to single-phase operation, and all that remains to be discussed in the interconnection which is shown in FIGS. 5 to 7 and in FIG. 8.

The alternative modes of operation discussed hereinbefore, for all the switching functions occuring in practice and even for special situations, demonstrate the wide scope of application of the switching device in accordance with the invention. It is noteworthy, in particular, that despite this versatility the construction and mode of operation of the switching device itself but also of the auxiliary devices HS and HC, are extremely simple. The alternative possibilities are in other words created essentially only by the provision of suitable connected lines, with terminals for the insertion of bridges and for the connection of the auxiliary units, without any major modification with respect to the fundamental design illustrated for example in FIGS. 1 and 2 being required.

In FIG. 8, a load circuit for a three-phase load LR + LS + LT supplies from a three-phase network through the phase lines R, S and T, and having a grounded center tap, has been illustrated. The input terminals for the supply voltage are marked in accordance with the phases, as ER, ES and ET and the output terminals to the load as AR, AS, and AT. The individual phase lines of the load circuit each contain a rectifier VR, VS and VT as well as two load switches I1R, II1R, I1S, II1S and I1T, II1T, M3R, M3S. There are three mutually identical (in terms of both design and operation) control devices M3T for operating the load switches, these devices being designed for example in accordance with FIG. 5.

If the illustrated arrangement is to operate without an auxiliary switch, then the bridges Br1R, Br1S and Br1T are inserted between the terminals K6/K7 for each phase line, the control devices M3R, M3S, and M3T in each case being connected between the associated phase line ER, or ES or ET, and ground. The mode of operation of this circuit corresponds to that already described in relation to FIGS. 1 and 2 and FIG. 5.

If the device is operated using an auxiliary switch HS, then bridges Br1R, Br1S and Br1T are removed and the auxiliary switch HS is connected by the terminals K1 to K5 to the control devices M3R, M3S and M3T. Here, as the illustration clearly shows, the make-and-break contacts $u1$, $u2$ and $u3$ are electrically isolated from the individual phase lines R, S, T, while the energizing winding U, the response of which is delayed by a series-arranged positive temperature coefficient resistor HL, is commonly driven by the three control devices M3R, M3S and M3T. The control devices themselves are in each case connected by the terminals K3R, K3S, K3T to the break contact of the make-and-break contacts $u1$ to $u3$, between the associated phase lines R, S, T and ground.

If, in the illustrated multiphase load circuit, a load of capacitive nature is to be switched, then it is possible, either with or without an auxiliary switch HS, by the inclusion of an auxiliary switching device HC in accordance with FIG. 7, to carry out completely off-load switching even of a multiphase capacitive load, in a manner already described with reference to FIGS. 5 to 7.

While preferred embodiments of the invention have been illustrated in the drawings and are herein particularly described, it will be understood that the invention is not limited to these embodiments.

What I claim is:

1. A hybrid switching device for connecting a load to an alternating current supply, comprising a half-wave rectifier, a first contactor connected in series with said rectifier between said load and said supply, a second contactor connected in parallel with said rectifier, each of said contactors comprising contacts operable to an open and a closed condition for completing an electrically conductive path and electrically energized operating means for opening and closing said contacts, and a control circuit for controlling the energization of said operating means to switch said load on and off, said control circuit comprising oppositely directed asymmetrically conducting elements and switching elements operable to close said first contactor contacts to connect the load to said rectifier during a half-cycle in which said rectifier is non-conductive and thereafter to close said second contactor contacts during a half-cycle in which said rectifier is conductive thereby applying an input current to said load, and operable to open said second contactor contacts during a half-cycle in which said rectifier is conductive and thereafter to open said first contactor contacts during a half-cycle in which said rectifier is non-conductive thereby removing said input current from said load.

2. A device as claimed in claim 1, wherein the control circuit for controlling the operation of said contactors includes at least one voltage-sensitive device which determines the part of the respective half-cycle in which the operating means of said contactors are energized.

3. A device as claimed in claim 2, wherein said voltage-sensitive device or each of said voltage-sensitive devices is a zener diode.

4. A device as claimed in claim 1, for use with capacitive loads, wherein energization of each of said operating means takes place immediately after the supply voltage has passed through zero.

5. A device as claimed in claim 1, wherein the contactors are controlled by a control quantity derived from the supply voltage.

6. A device as claimed in claim 1, wherein the contactors are controlled by a control quantity derived from the load current.

7. A device as claimed in claim 1, wherein the response time of each contactor is shorter than half the period of the supply voltage.

8. A device as claimed in claim 1, wherein means is provided for electrically pre-energizing the contactors.

9. A hybrid switching device for connecting a load to an alternating current supply, comprising a half-wave rectifier, a first contactor connected in series with said rectifier between said load and said supply, a second contactor connected in parallel with said rectifier, each of said contactors comprising contacts and operating means and a control circuit for controlling the operations of said contactors to switch said load on or off, said control circuit comprising oppositely directed asymmetrically conducting means and switching elements operable in switching said load "on" first and exclusively to close said first contactor to connect the load to the supply through said rectifier during a half-cycle in which said rectifier is non-conductive and thereafter to close said second contactor during a half cycle in which said rectifier is conductive, and operable in switching said load "off" first and exclusively to open said second contactor during a half-cycle in which said rectifier is conductive and thereafter to open said first contactor during a half-cycle in which said rectifier is non-conductive, wherein the energizing current used to operate the contactors is higher than the nominal energizing current, and wherein circuit elements are provided to limit the time of application of this excess current.

10. A device as claimed in claim 9, wherein said circuit elements are selected from the group consisting of capacitors, start and stop keys having wiper contacts, and positive temperature coefficient resistors.

11. A hybrid switching device for connecting a load to an alternating current supply, comprising a half-wave rectifier, a first contactor connected in series with said rectifier between said load and said supply, a second contactor connected in parallel with said rectifier, each of said contactors comprising contacts and operating means and a control circuit for controlling the operating of said contactors to switch said load on or off, said control circuit comprising oppositely directed asymmetrically conducting means and switching elements operable in switching said load "on" first and exclusively to close said first contactor to connect the load to the supply through said rectifier during a half-cycle in which said rectifier is non-conductive and thereafter to close said second contactor during a half-cycle in which said rectifier is conductive, and operable in switching said load "off" first and exclusively to open said second contactor during a half-cycle in which said rectifier is conductive and thereafter to open said first contactor during a half-cycle in which said rectifier is non-conductive, wherein the contactors are bistable.

12. A hybrid switching device for connecting a load to an alternating current supply, comprising a half-wave rectifier, a first contactor connected in series with said rectifier between said load and said supply, a second contactor connected in parallel with said rectifier, each of said contactors comprising contacts and operating means and a control circuit for controlling the operating of said contactors to switch said load on or off, said control circuit comprising oppositely directed asymmetrically conducting means and switching elements operable in switching said load "on" first and exclusively to close said first contactor to connect the load to the supply through said rectifier during a half-cycle in which said rectifier is non-conductive and thereafter to close said second contactor during a half-cycle in which said rectifier is conductive, and operable in switching said load "off" first and exclusively to open said second contactor during a half-cycle in which said rectifier is conductive and thereafter to open said first contactor during a half-cycle in which said rectifier is non-conductive, and further including an auxiliary contactor having normally open contacts in the load circuit, said contacts being effective when closed to reduce the load on the contacts of the first and second contactors, wherein means are provided for energizing said auxiliary contactor at switch-on after the closure of the contacts of the second contactor.

13. A device as claimed in claim 12, wherein said auxiliary contactor has a plurality of normally open contacts connected in parallel in the load circuit.

14. A device as claimed in claim 12, wherein the auxiliary contactor has a normally closed contact serving, at switch-off, to delay the opening of the contacts of the first and second contactors until the normally open contacts of the auxiliary contactor are open.

15. A device as claimed in claim 14, wherein said normally open and normally closed contacts are constituted by change-over contacts.

16. A device as claimed in claim 12, including means for ensuring that the contacts of the auxiliary contactor close after the closing of the contacts of the second contactor, and on the other hand that the operating means of the first and second contactors can only be energized after the contacts of the auxiliary contactor have opened.

17. A device as claimed in claim 12, for use in polyphase circuits, wherein a single auxiliary contactor is provided for all the phases and wherein operation of said auxiliary contactor is delayed by means of a delay element until all the first and second contactors in the various phases are closed.

18. A device as claimed in claim 17, wherein said delay element is a negative-temperature-coefficient resistor.

19. A device as claimed in claim 17, wherein the delay element is electrically shunted during the time of operation of the auxiliary contactor by normally open contacts of the auxiliary contactor.

20. A hybrid switching device for connecting a load to an alternating current supply, comprising a half-wave rectifier, a first contactor connected in series with said rectifier between said load and said supply, a second contactor connected in parallel with said rectifier, each of said contactors comprising contacts and operating means and a control circuit for controlling the operating of said contactors to switch said load on or off, said control circuit comprising oppositely directed asymmetrically conducting means and switching elements operable in switching said load "on" first and exclusively to close said contactor to connect the load to the supply through said rectifier during a half-cycle in which said rectifier is non-conductive and thereafter to close said second contactor during a half-cycle in which said rectifier is conductive, and operable in switching said load "off" first and exclusively to open said second contactor during a half-cycle in which said rectifier is conductive and thereafter to open said first contactor during a half-cycle in which said rectifier is non-conductive, and including another rectifier connected in series with the contacts of said second contactor, wherein the two series combinations of rectifiers and contacts are arranged in parallel with one another, said rectifiers having opposite polarities to one another; and wherein means are provided for operating the two contactors in such a way that both at switch-on and at switch-off the contacts of each of the contactors are closed and opened respectively only during a time interval in which the particular rectifier in series therewith is non-conducting.

* * * * *